Figure 1:
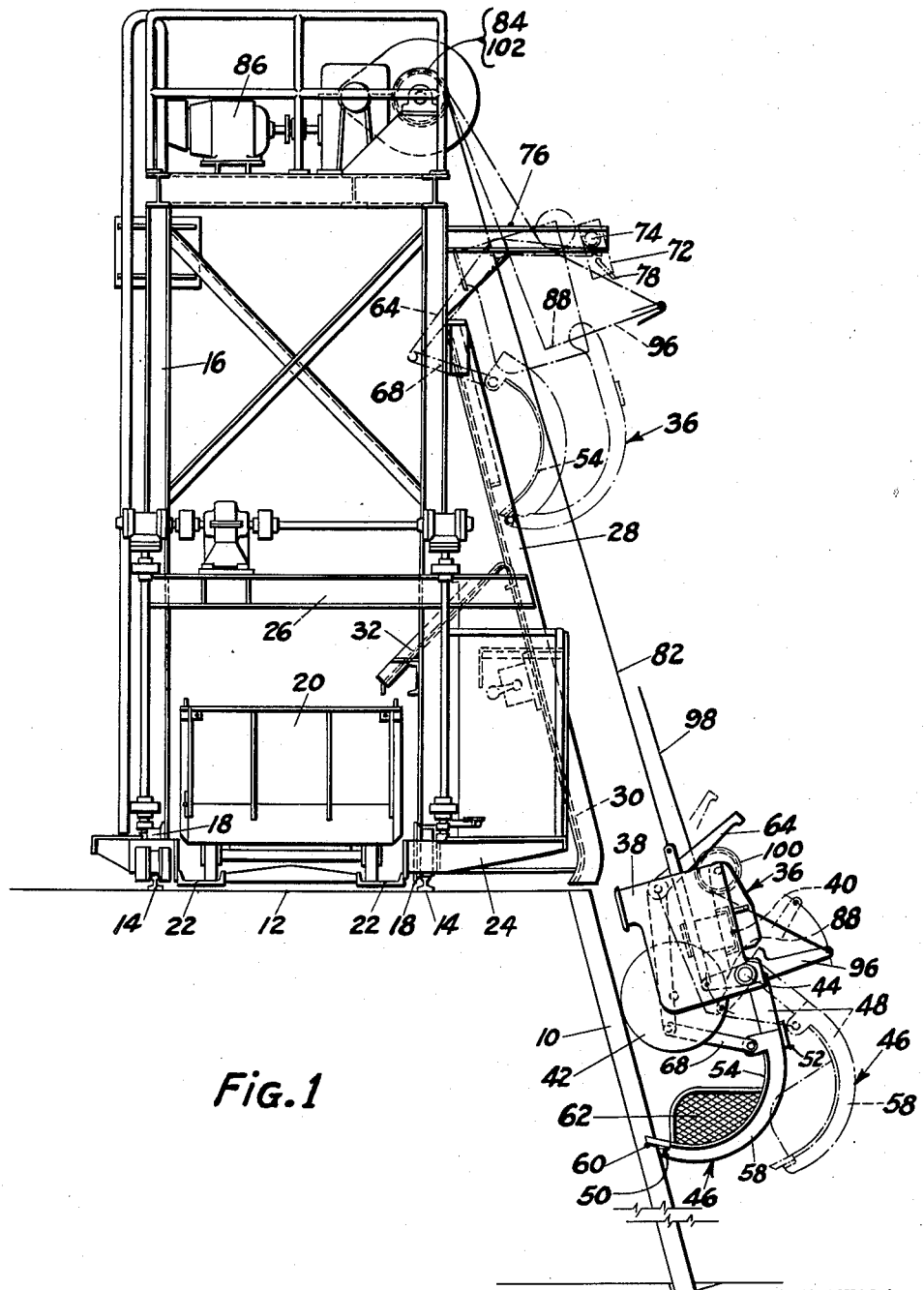

INVENTORS
DOUGLAS H. BAKER
AND ROBERT G. SCHAALE
BY
ATTORNEY

INVENTOR.
DOUGLAS H. BAKER
AND ROBERT G. SCHAALE
BY
ATTORNEY

INVENTORS
DOUGLAS H. BAKER
AND ROBERT G. SCHAALE
BY
ATTORNEY

United States Patent Office 2,904,181
Patented Sept. 15, 1959

2,904,181

RAKE FOR TRASH RACK

Douglas H. Baker and Robert G. Schaale, York, Pa., assignors, by mesne assignments, to Allis-Chalmers Manufacturing Company, Milwaukee, Wis., a corporation of Delaware Application August 3, 1956, Serial No. 602,043

12 Claims. (Cl. 210—159)

This invention relates to improvements in a rake for use with a trash rack and more particularly for use with a trash rack of the type used for purposes of causing debris to be accumulated against parallel grate bars across the intake end of a flume or mill race, sluiceway, or the like, particularly of the type used in hydro-electric power plant installations, so as to prevent such trash from entering such intake. However, it is to be understood that the rake comprising the present invention may be used with any sutable type of trash rack having substantially vertical grate bars, regardless of the purpose for which the rack is used.

Especially where the intake of water through such trash rack is essential in required quantities, it is important that the rack be maintained as free as possible of such accumulated debris and trash such as sticks, logs, and many other types of floating objects such as boxes, leaves, and even barrels. It is difficult for attending workmen to remove such debris easily by manual means such as using grab hooks. Hence, a number of various types of trash rakes have been devised heretofore for purposes of mechanically removing accumulated debris from trash racks of the type referred to above.

One of the principal objections to such previously devised trash rakes however has been the fact that most of them included pronged rake members which frequently became entangled with the accumulated debris while being elevated from the trash rack, whereby when the debris was to be dumped, it was difficult to disentangle the same from the rake members.

It is the principal object of the present invention to provide a power operated trash rake unit which may be supported upon suitable rails extending along the top of a flume or sluiceway, whereby the unit may be moved longitudinally along the same progressively between successive operations of the rake unit, whereby the entire width of the trash rack may be cleaned with no physical effort being required other than to control the operation of the various power means embodied in the unit. Further, the trash rake unit embodies means which, when dumped, insure complete removal of all debris therefrom, thereby producing an efficiency of operation considerably in excess of that possible with previously used trash rakes.

A further object of the invention is to provide improved operating mechanism for the rake unit which will insure effective operation of the unit so as to engage accumulated debris against a trash rack and also move the unit into sliding engagement with the trash rack during the ascending or raking movement of the unit, said mechanism also insuring effective dumping of the debris from the raking unit when the upper limit of travel of the same has been reached. Said mechanism still further insures the restoration of the various components of the unit to intended operative position thereof following the dumping operation.

One further object of the invention is to provide a trash rake which is not only effective in operation but also is durable so as to be capable of long life with a minimum amount of attention and repair, and the entire operation of the raking unit may be accomplished from a position remote from the unit.

Details of the foregoing objects and of the invention, as well as other objects thereof, are set forth in the following specification and illustrated in the accompanying drawings comprising a part of the same.

In the drawings:

Fig. 1 is a side elevation of an exemplary trash rake unit embodying the principles of the present invention and illustrating the rake member of the unit in raking position upon a trash rack, in full lines, while in dotted lines the rake member is shown in retracted or descending position relative to the trash rack. Said figure also illustrates schematically, in broken lines, the elevated position of the rake member both in dumping and nondumping positions.

Figure 2:
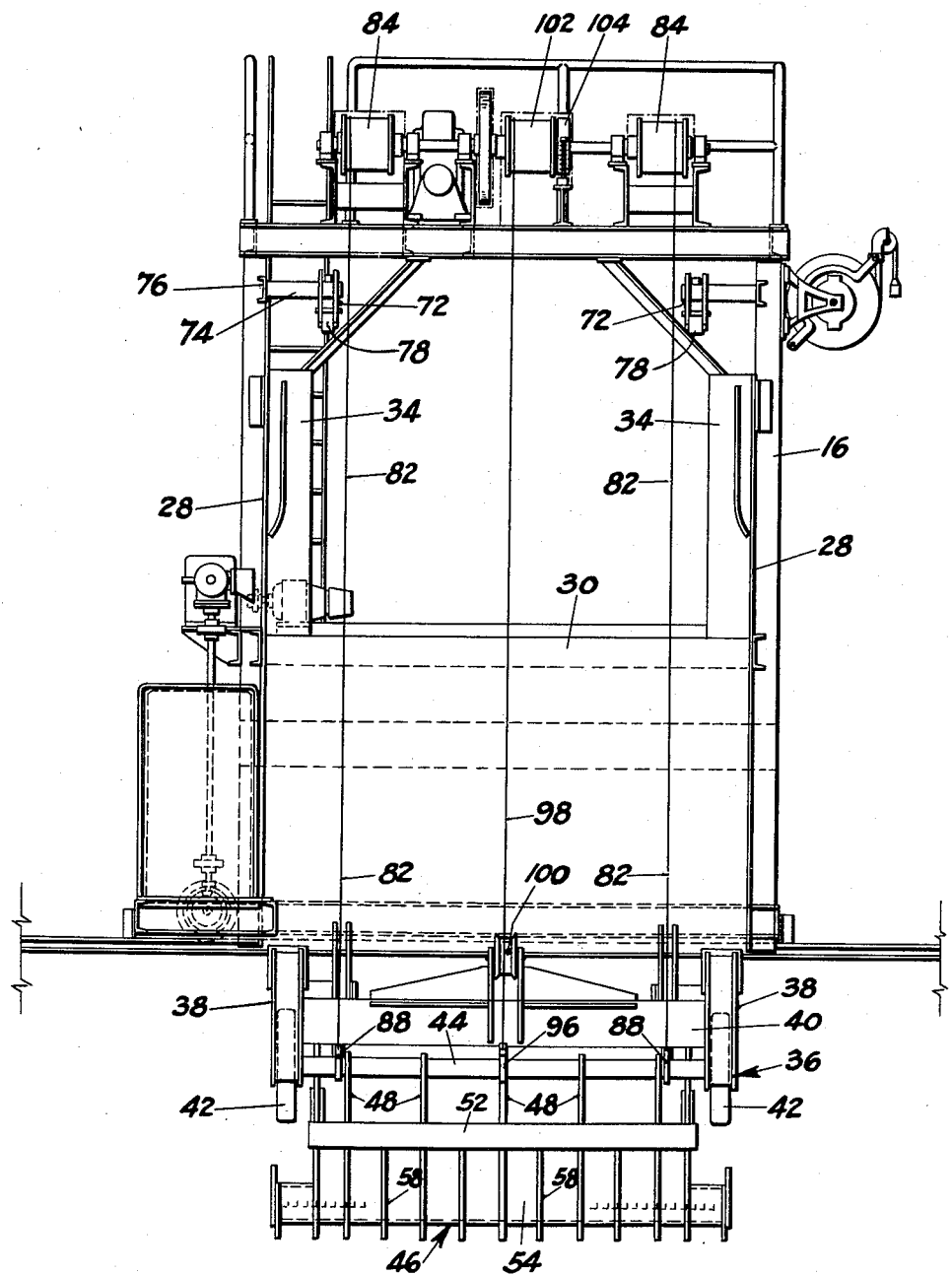

Fig. 2 shows a front view of the trash rake unit illustrated in Fig. 1.

Figure 3:
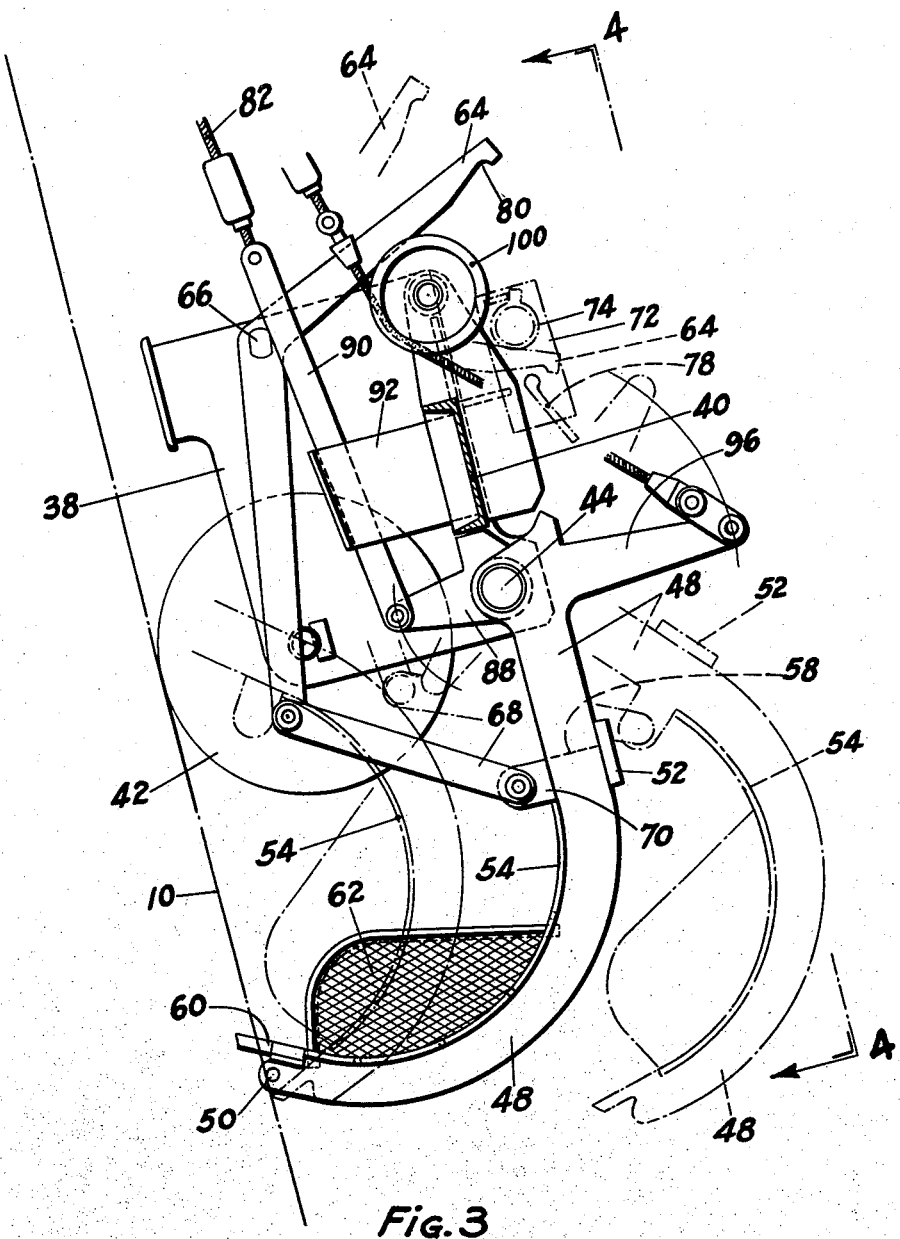

Fig. 3 illustrates, on a scale larger than in Figs. 1 and 2, a side view of the rake member and its supporting frame, the rake being illustrated in full lines in raking position, while in broken lines the rake member is shown in retracted or descending position. This view also illustrates, in addition, also in broken lines, several different positions assumed by the bell cranks during the dumping position of the rake member.

Figure 4:
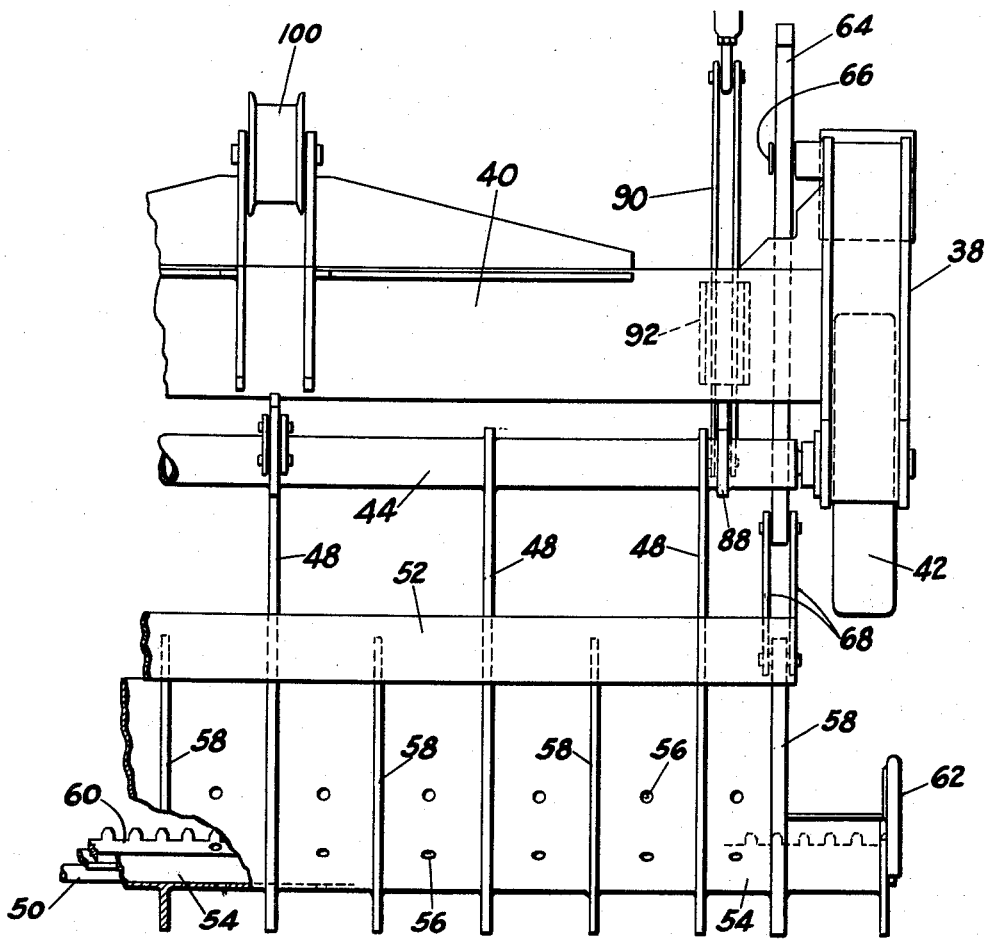

Fig. 4 is a fragmentary front view, on the same scale as Fig. 3 and taken on the line 4—4 thereof, illustrating the rake member and its supporting frame per se, part of certain of the members being broken away to better illustrate details of the construction.

Referring to Fig. 1 particularly, it will be seen that an exemplary trash rack 10, comprising slanting but parallel rake bars are positioned over the water inlet of a sluiceway comprising a top wall 12 upon which a pair of tracks 14 are mounted. The trash rake assembly comprising the present invention includes a suitable frame 16 which comprises wheels 18 engaging the rails 14 so that the frame 16 may move longitudinally along the top of the sluiceway and thus dispose the rake assembly at any desired position along the trash rack 10, by power means, not shown.

It will also be seen from Fig. 1 that a trash receiving car 20 is supported by tracks 22 carried by the lower portion of frame 16. Suitable frame members 24 and 26 support a pair of sloping guide members 28 between which an apron 30 extends, said apron being continuous from the lower end of the guide members 28 to a position intermediate the length thereof. A discharge chute 32 slopes oppositely from the apron 30 and the upper ends of the chute and apron are connected preferably by a smooth curve in order that debris moved up the apron by the rake unit, to be described, will readily be discharged from the upper end of the apron 30 and slide down the chute 32 into the trash receiving car 20. Extending inward from both of the members 28 above the upper edge of the apron 30 is a pair of apron extensions 34, for purposes to be described.

The rake unit generally designated 36 comprises a pair of frame members 38 which are connected by a horizontal member 40 extending therebetween. Each of the frame members also rotatably support a guide wheel 42 which engages the trash rack rake bars 10, the apron 30, and the apron extensions 34 during the ascending and descending movements of the rake unit 36, so as to guide the rake unit correctly.

Also extending between the frame members 38 is a horizontal shaft 44, which may be tubular if desired. Said shaft 44 comprises the pivot means for the rake member or unit 46.

The rake member or unit 46 actually comprises an assembly of components including a plurality of spaced, downwardly and inwardly curved bars 48, the upper ends of which are connected to the shaft 44. As best seen in Figs. 3 and 4, a horizontal rod 50 extends between the lower ends of the curved bars 48. Said bars 48 also are connected by a flat horizontal bar 52 so as to brace said bars 48 relative to each other and comprise an open frame against the inner surface of which a rake shell or liner 54 conforms in raking position. The shell 54 preferably is provided with a plurality of drain holes 56, best shown in Fig. 4.

A plurality of curved shorter bars 58 which extend downwardly from horizontal bar 52 but are not connected thereto, are curved similarly to bars 48. The shorter curved bars 58 are fixed by welding or otherwise to the shell 54 to brace the same and also effect a hinged connection for the shell 54 to the bars 48 due to the fact that the lower ends of the curved bars 58 also are apertured to receive the horizontal rod 50 which actually comprises a hinge pin. Extending horizontally between and connected to the lower ends of the bars 58 is a toothed rake bar 60, the teeth of which are spaced so as to extend between the grate bars of the trash rake 10 a limited distance as indicated in Fig. 3. The upstream face of the trash rake 10 is indicated by the broken line bearing the reference numeral 10 in said figure and it will be seen that the teeth of the rake bar 60 projects downstream a short distance beyond said face of the trash rack 10. Such arrangement is to insure reception of debris within the shell 54 when the various components of the rake member 46 are positioned as shown in full lines in Figs. 1 and 3.

Further to improve the efficiency of the shell 54 comprising a part of the rake member 46, a pair of end screens 62 preferably are fixed to the outer ends of the shell 54 as shown best in Figs. 3 and 4.

When the rake member 46 is disposed in the full line position shown in Figs. 1 and 3, and slidably engages the grate bars of the trash rack 10 during ascending movement, the shell 54 will be disposed against the curved bars 48 and the upper ends of the shorter curved bars 58 will abut the horizontal bar 52 of the unit. Such ascending movement of the rake member will be guided by the trash rack 10 until the upper end is reached, at which time the lower end of the rake member 46 will slidably engage the apron 30 and ultimately the apron extensions 34. When the upper end of the apron 30 is reached, or shortly thereafter, the rake effectively is dumped by pivotally moving the shell 54 from the full line position thereof shown in Fig. 3 to the broken line position thereof shown to the left of the full line position and in which latter position it will be seen that debris readily will fall from the shell 54 upon the chute 32 and into the car 20. Such dumping movement of the shell 54 is achieved by the following mechanism.

Referring particularly to Figs. 3 and 4, a pair of bell cranks 64 respectively are pivotally connected to the frame members 38 by pivots 66. The lower end of each bell crank 64 is connected by a pair of links 68 to an ear 70 fixed to the outermost short curved bars 58. As the rake unit 36 is moved in ascending direction, the outer ends of the bell cranks 64 engage trip latches 72 pivotally supported by stop members 74. The stop members 74 may be in the form of tubes extending horizontally toward each other from a pair of frame members 76 respectively fixed to the uprights of frame 16 as clearly shown in Figs. 1 and 2.

The trip latches 72, as best seen from Fig. 2, preferably comprise a pair of side plates which are spaced apart and between which a deflecting member 78 is disposed at an angle. Note particularly Fig. 3 where the same is illustrated in phantom.

As the rake unit 36 rises as aforesaid, the outer ends of the bell cranks 64 simultaneously first engage the deflecting member 78 of the respective latches 72 and cause the latches to be deflected or cammed counter-clockwise as viewed in Figs. 1 and 3, until the deflecting member 78 is cleared, whereupon the latches will drop over the outer ends of the bell cranks 64 so that said outer ends will be disposed between the deflecting members 78 and stop members 74, as shown in phantom in Fig. 3. Continued upward movement of the rake unit will cause the outer ends of the bell cranks 64 to abut the fixed stop members 74 and still further movement of the rake unit will result in the bell cranks turning clockwise as viewed in Figs. 1 and 3, thereby moving the links 68 and the shell 54 about the pivot rod 50, to the broken line position of the shell 54 shown at the left in Fig. 3, this being the dumping position thereof.

Following the dumping operation of the shell 54, descending movement of the rake unit 36 first results in the outer ends of the bell cranks 64 riding upon the upper edges of the deflecting member 78 of the latches 72, the undersurfaces of the outer ends of the bell cranks 64 preferably having notches 80 therein which will receive the upper edges of the deflecting member 78 and positively insure counter-clockwise movement of the bell cranks 64 before the outer ends thereof disengage the deflecting members 78, thereby insuring return of the shell 54 to the normal or raking position thereof relative to the bars 48 following a dumping operation of the shell.

Ascending and descending movements of the rake unit 36 are effected by flexible means preferably comprising cables. It is to be understood of course that other flexible means such as chains may be used if desired however. The rake unit 36 principally is raised and lowered by means of a pair of cables 82 respectively coiled about drums 84 supported by the super-structure of the frame 16. The drums 84 are operated simultaneously either in lowering or elevating direction by any suitable power means such as motor 86. A remote control switch, not shown, may be located in a suitable position to operate the motor 86 as desired. Any conventional control and switch means for this purpose may be used.

The lower ends of the cables 82 respectively are connected to the outer ends of a pair of arms 88 fixed to shaft 44. A pair of intermediate links 90 may be used if desired between said outer ends of the arms 88 and the connector to cable 82. Further, U-shaped stabilizing members 92 also may be used to surround the links 90 for purposes of limiting swinging movement of the rake unit 36 relative to the guide wheels 42 in one direction.

It will be seen, that when the cables 82 are coiled about the drums 84, pull upon the outer ends of the arms 88 will result in the curved bars 48, within which the shell 54 normally reposes, to be moved from the descending broken line position shown in Fig. 3 to the full line, ascending position thereof shown in said figure, in which the lower or inner end of the rake unit 36 is disposed against the trash rack 10 so as to be slidable against the outer surface thereof.

When however the rake unit 36 is descending, it is necessary that the lower or rake end thereof be retracted to the broken line position thereof relative to the trash rack 10, as shown in Fig. 3 in order that the raking end of the unit 36 may pass over debris accumulated against the rack 10 and be disposed beneath the debris when the cables 82 next are coiled upon the drums 84 for purposes of elevating the rake unit 36. Accordingly, when the rake unit 36 is descending, all of the curved bars 48 and the shell 54 are maintained in the retracted or broken line position shown in Fig. 3 by means of another arm 96 which is connected also to the shaft 34 intermediately of the ends thereof as shown in Fig. 2. Another cable 98 is connected to the outer end of arm 96 and passes beneath a sheave 100 and thence upwardly to still another drum 102 intermediately of drums 84. However, drum 102 is connected to a suitable friction brake 104 and also control mechanism including a spring clutch and overrunning key, of conventional nature, may be used relative to the drum 102.

During the descending movement of the rake unit 36 following a dumping operation thereof, the motor controls will be actuated suitably to permit the drums 84 to uncoil the cables 82 to permit such descent of the rake unit. However, the control means for the drum 102 and particularly the friction brake 104 will impose a greater drag upon the cable 98, whereby the arm 96 will be moved counter-clockwise and also cause all of the curved bars 48 within which the shell 54 is positioned to move to the retracted or descending position shown in broken lines in Figs. 1 and 3. During the initial portion of the descending operation, the shell 54 will have been restored to its normal operating position from the dumping position thereof, as described hereinabove. After the rake member 46 has been disposed below the next batch of debris to be elevated and removed from the trash rack 10, the movement of the drums 84 is reversed so as to coil the cables 82 thereupon and such operation places a greater force upon the arms 88 than the control means for the drum 102 imposes upon the cable 98. Accordingly, the rake member 46 is moved to the full line or raking position thereof shown in Figs. 1 and 3 relative to the trash rack 10, thereby causing the trash accumulated against the rack to be disposed within the rake shell 54 and moved thereby upwardly until dumped down the chute 32 into the car 20.

No circuit for operating the motor 86 or the controls for the brake 104, etc. have been illustrated since the same are conventional and it is not believed that illustration thereof is necessary.

Due particularly to the fact that all of the debris to be removed from the trash rack 10 will be received within the shell 54 which, except for a reasonable number of drain holes 56 is impervious and smoothed surfaced and also since the teeth on the bar 60 are disposed a predetermined distance between the grating bars of the trash rack 10 during the debris elevating movement of the rake unit 36, it will be seen that there is substantially no means with which any of the trash or debris such as leaves, sticks, logs, barrels, etc. may become enmeshed or entangled. Hence, when the upper end of the apron 30 is reached and the shell 54 is to be moved to dumping position to discharge the accumulated debris therein, a complete and clean dumping of the debris from the shell 54 is assured. Further, the distinctive structure of the latch members 72 insures actuation of the bell cranks 64 to restore the shell 54 to its normal raking position following a dumping operation thereof.

While the invention has been described and illustrated in its preferred embodiment, and has included certain details, it should be understood that the invention is not to be limited to the precise details herein illustrated and described since the same may be carried out in other ways falling within the scope of the invention as claimed.

We claim:

1. A rake unit for removing debris from a trash rack having vertical parallel grate bars, said rake unit comprising in combination, a frame, means supporting said frame for movement up and down said grate bars of said rack and above the same, a rake member having a raking end slidably engageable with said trash rack, means pivotally connecting said rake member to said frame for pivotal movement about an axis parallel to said trash rack, means connected to said rake member and operable when said rake unit is descending said rack to maintain said raking end of said rake member spaced away from said rack, additional means connected to said rake member and operable when said rake unit is ascending said rack to hold said raking end of said member in sliding engagement with the grate bars of said rack; said rake unit including a curved shell extending substantially horizontally to receive and hold debris raked from said grate, one edge of said shell being adjacent said rack when in raking position, a plurality of bracing bars curved to conform to the shape of said shell and fixed thereto in transversely spaced arrangement, a plurality of supporting members curved downwardly and inwardly toward said rack complementarily to the curvature of said shell and receiving said shell to support the same relative to said unit, said supporting members being spaced between said curved bracing bar, and means pivotally connecting said one edge of said shell to said supporting members adjacent the outer ends thereof; and dumping means interconnected to said shell of said rake member and operable when said unit is elevated above said rack to move said shell pivotally relative to the outer ends of said supporting members of said rake member to dumping position and effect discharge of debris from said rake unit.

2. A rake unit for removing debris from a trash rack having vertical parallel grate bars, said rake unit comprising in combination, a frame, means supporting said frame for movement up and down said grate bars of said rack and above the same, a rake member having a raking end slidably engageable with said trash rack, means pivotally connecting said rake member to said frame for pivotal movement about an axis parallel to said trash rack, means connected to said rake member and operable when said rake unit is descending said rack to maintain said raking end of said rake member spaced away from said rack, additional means connected to said rake member and operable when said rake unit is ascending said rack to hold said raking end of said member in sliding engagement with the grate bars of said rack; said rake unit including a curved shell extending substantially horizontally to receive and hold debris raked from said grate, one edge of said shell being adjacent said rack when said raking member is in raking position thereon, a toothed bar substantially coextensive with and connected to said one edge, the teeth on said bar being disposed within the spaces between the grate bars of said rack when said rake unit is disposed in raking position thereon, transversely spaced supporting members curved downwardly and inwardly toward said rack and conforming to the curvature of said shell to receive and support the same relative to said rake unit, and means pivotally connecting said one edge of said shell to said supporting members adjacent the outer ends thereof; and dumping means interconnected to said shell of said rake member and operable when said unit is elevated above said rack to move said shell and toothed bar pivotally relative to the outer ends of said supporting members of said rake member to dumping position to discharge debris from said rake unit.

3. A rake unit for removing debris from a trash rack having vertical parallel grate bars, said rake unit comprising in combination, a frame, means supporting said frame for movement up and down said grate bars of said rack and above the same, a rake member having a raking end slidably engageable with said trash rack, means pivotally connecting said rake member to said frame for movement about an axis parallel to said trash rack, means connected to said rake member and operable when said rake unit is descending said rack to maintain said raking end of said rake member spaced away from said rack, additional means connected to said rake member and operable when said rake unit is ascending said rack to hold said raking end of said member in sliding engagement with the grate bars of said rack; said rake unit including a curved shell extending horizontally to receive and hold debris raked from said grate, transversely spaced supporting members curved downwardly and inwardly toward said rack and receiving said shell to support the same relative to said unit, and means pivotally connecting said shell to said supporting members; spaced bell crank means carried by said rake unit, and links connecting one end of each of said bell cranks respectively to laterally spaced portions of said shell, the other ends of said bell crank means being engageable with trip means after said rake unit has been elevated above said trash rack to be moved pivotally in a direction to cause said shell to be moved pivotally relative to the supporting means of said rake member to dumping position to discharge debris from said rake unit and said other ends of said bell cranks being sufficiently long to remain in engagement with said trip means during the initial part of the descending movement of said unit to move said bell cranks reversely to said aforementioned direction and thereby positively move said shell back into engagement with said supporting members.

4. A rake unit for removing debris from a trash rack having vertical parallel grate bars, said rake unit comprising in combination, a frame, means supporting said frame for movement up and down said grate bars of said rack and above the same, a rake member having a raking end slidably engageable with said trash rack, means pivotally connecting said rake member to said frame for movement about an axis parallel to said trash rack, means connected to said rake member and operable when said rake unit is descending said rack to maintain said raking end of said rake member spaced away from said rack, additional means connected to said rake member and operable when said rake unit is ascending said track to hold said raking end of said rake member in sliding engagement with the grate bars of said rack; said rake unit including a curved shell extending horizontally to receive and hold debris raked from said grate, transversely spaced supporting members curved downwardly and inwardly toward said rack and receiving said shell to support the same relative to said unit, and means pivotally connecting said shell to said supporting members; spaced bell crank means carried by said rake unit, links connecting one end of each of said bell cranks respectively to laterally spaced portions of said shell, and trip latch members having deflecting means mounted in fixed relationship to and above said trash rack during any raking movement of said rake unit, the other ends of said bell crank means being engageable with the deflecting means of said trip latch members after said rake unit has been elevated above said trash rack to effect disengageable connection of said bell cranks and latch members to cause said shell to be moved relative to the supporting means of said rake member to dumping position to discharge debris from said rake unit, the disengageable connection between said bell cranks and latch members also causing said bell cranks and links to restore said shell positively to raking position within said supporting members upon the commencement of descending movement of said rake unit, followed by disengagement of said bell cranks from said latch members.

5. A rake unit for removing debris from a trash rack having vertical parallel grate bars, said rake unit comprising in combination, a frame, means supporting said frame for movement up and down said grate bars of said rack and above the same, a rake member having a raking end slidably engageable with said trash rack and movable between predetermined raking and dumping positions relative to said rake unit, means pivotally connecting said rake member to said frame for movement about an axis parallel to said trash rack, lever arms connected to and respectively projecting transversely from said rake member in opposite directions from the pivotal axis thereof, cable means connected to one of said lever arms of said rake member and operable when said rake unit is descending said rack to maintain said raking end of said rake member spaced away from said rack, additional cable means connected to the other lever arm of said rake member and operable when said unit is ascending said rack to hold said raking end of said rake member adjacent the grate bars of said rack while moving therealong, drum means respectively having portions of said cable means coiled thereabout, means operable to move said drum means in opposite directions respectively to move said cable means to move said rake unit in ascending and descending directions, brake means operable upon the drum means for said first mentioned cable means to place said cable means thereon under greater tension than the additional cable means during descent of said rake unit, thereby to hold said raking end of the rake member away from said trash rack during such descent, and dumping means interconnected to said rake member and operable when said member is elevated above said rack to dump said rake member.

6. A rake for a trash rack comprising a rake unit and means supporting said unit for movement up and down a trash rack and guide means extending upward therefrom; said rake unit comprising in combination, a plurality of rake-like members spaced transversely across said rack when the unit is mounted operatively thereon, one end of said members being slidable adjacent said rack when moving upwardly in raking direction, a shell extending transversely between said rake members and normally resting upon the inner surfaces thereof and operable to receive and move debris up and down said rack when said unit is elevated therealong, and means movably connecting said shell relative to said rake-like members for support thereby and movement relative to said members between a debris-receiving and supporting position upon said members to a dumping position away from said members and toward said rack or guide means extending upward from said rack, thereby to discharge debris from said unit while said one end of each of said rake-like members remains adjacent said rack or guide means.

7. The rake for a trash rack set forth in claim 6 further characterized by said rake-like members being hook-shaped and extending downwardly and inwardly toward said rack when in raking position relative to said rack, and said shell being curved complementarily to the inner surfaces of said rake-like members.

8. A rake for a trash rack comprising a rake unit and means supporting said unit for movement up and down a trash rack and guide means extending upward therefrom; said rake unit comprising in combination, a plurality of rake-like members spaced transversely across said rack when the unit is mounted operatively thereon, one end of said members being slidable adjacent said rack when moving upwardly in raking direction, a shell extending transversely between said rake members and normally resting upon the inner surfaces thereof and operable to receive and move debris up and down said rack when said unit is elevated therealong, and means pivotally connecting one edge of said shell to said one end of said rake-like members for support thereby and pivotal movement relative to said members between a debris-receiving and supporting position upon said members to a dumping position away from said members and toward said rack or guide means extending upward from said rack, thereby to discharge debris from said unit while said one end of said members remain adjacent said rack or guide means.

9. A rake for a trash rack comprising a rake unit and means supporting said unit for movement up and down a trash rack and guide means extending upward therefrom; said rake unit comprising in combination, a plurality of rake-like members spaced transversely across said rack when the unit is mounted operatively thereon, one end of said members being slidable adjacent said rack when moving upwardly in raking direction, a shell extending transversely between said rake members and normally resting upon the inner surfaces thereof and operable to receive and move debris up and down said rack when said unit is elevated therealong, means pivotally connecting one edge of said shell relative to said one end of said rake-like members for support thereby and movement relative to said members between a debris-receiving and supporting position upon said members to a dumping position away from said members and toward said guide means extending upward from said rack, actuating means interconnected to the opposite edge of said shell, and trip means supported upon said guide means extending upward from said trash rack and engageable by said actuating means when said rake unit reaches dumping position, thereby to discharge debris from said unit by movement of said shell about the axis of said pivotal connection thereof while said one end of said members remain adjacent said guide means.

10. The rake for a trash rack set forth in claim 9 further characterized by said actuating means comprising bell cranks pivotally supported upon said units and links pivotally connected at one end to one end of each of said bell cranks and pivotally interconnected at the other ends to said opposite edge of said shell, the other ends of said bell cranks being engageable with said trip means when said dumping position is reached by said unit during movement thereof along said guide means.

11. A rake for a trash rack comprising a rake unit and means supporting said unit for movement up and down a trash rack comprising vertical parallel grate bars and guide means extending upward therefrom; said rake unit comprising in combination, a frame, means supporting said frame for movement up and down said grate bars and guide means, a rake unit comprising a plurality of curved rake-like members spaced transversely across said rack when the unit is mounted operatively thereon, one end of said members comprising raking ends positioned slidably adjacent said rack when moving upwardly in raking direction, a curved shell complementary to and extending transversely between said rake members and normally resting upon the inner surfaces thereof and operable to receive and move debris up and down said rack when said unit is elevated therealong, means movably connecting said shell relative to said rake-like members for support thereby and movement relative to said rake-like members between a debris-receiving and supporting position upon said members to a dumping position away from said members and toward said guide means extending upward from said rack, rake unit positioning means connected to said rake unit and operable when said unit is descending said guide means and rack to maintain said raking ends of said rake-like members spaced away from said guide means and rack, additional positioning means connected to said rake unit and operable when said unit is ascending said rack and guide means to hold said raking ends of said rake-like members adjacent the grate bars and guide means, and dumping means interconnected to said shell and operable when said unit reaches dumping position during ascending movement to move said shell to dumping position, thereby to discharge debris from said unit while said one end of said rake-like members remain adjacent said guide means.

12. A rake for a trash rack comprising a rake unit and means supporting said unit for movement up and down a trash rack comprising vertical parallel grate bars and guide means extending upward therefrom; said rake unit comprising in combination, a frame, means supporting said frame for movement up and down said grate bars and guide means, a rake unit comprising a plurality of rake-like members curved downwardly and inwardly toward said rack and spaced transversely across said rack when the unit is mounted operatively thereon, one end of said members comprising raking ends positioned slidably adjacent said rack when moving upwardly in raking direction, a curved shell complementary to and extending transversely between said rake-like members and normally resting upon the inner surfaces thereof and operable to receive and move debris up and down said rack when said unit is elevated therealong, one edge of said shell being adjacent the raking ends of said rake members, means pivotally connecting said one edge of said shell relative to said rake-like members for support thereby and pivotal movement relative to said rake-like members between a debris-receiving and supporting position upon said members to a dumping position away from said members and toward said guide means extending upward from said rack, rake unit positioning means connected to said rake unit and operable when said unit is descending said guide means and rack to maintain said raking ends of said rake-like members spaced away from said guide means and rack, additional positioning means connected to said rake unit and operable when said unit is ascending said rack and guide means to hold said raking ends of said rake-like members adjacent the grate bars and guide means, and dumping means interconnected to said shell and operable when said unit reaches dumping position during ascending movement to move said shell pivotally to dumping position, thereby to discharge debris from said unit while said one end of said rake-like members remain adjacent said guide means.

References Cited in the file of this patent

UNITED STATES PATENTS

| | | |
|---|---|---|
| 1,760,509 | Marvel | May 27, 1930 |
| 2,518,119 | Breda | Aug. 8, 1950 |

FOREIGN PATENTS

| | | |
|---|---|---|
| 174,598 | Great Britain | July 27, 1922 |
| 244,946 | Great Britain | Dec. 31, 1925 |